Figure 1:
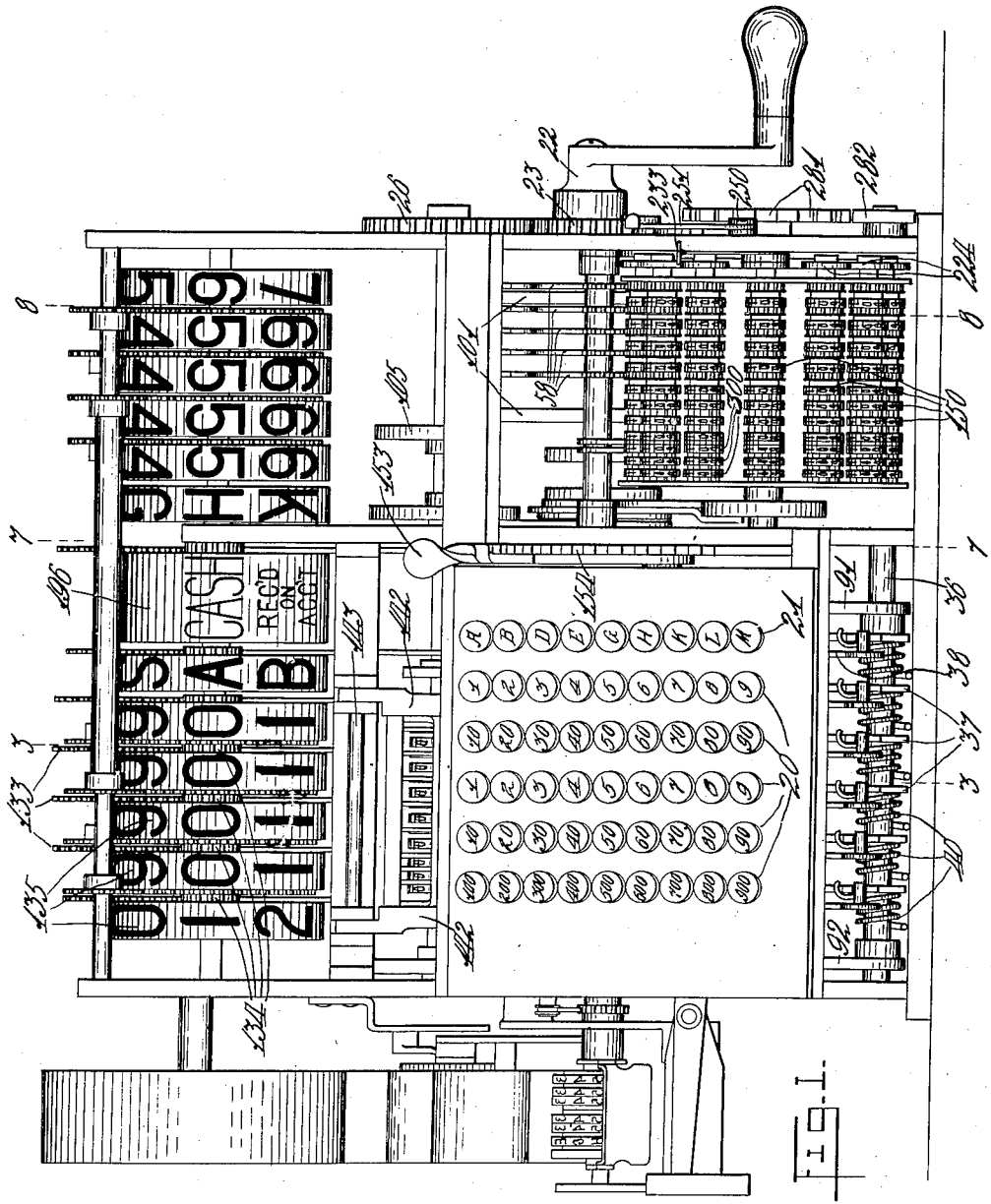

T. CARROLL.
CASH REGISTER.
APPLICATION FILED AUG. 5, 1905.

1,006,356.

Patented Oct. 17, 1911.
9 SHEETS—SHEET 1.

Witnesses

Thomas Carroll
Inventor
Attorneys

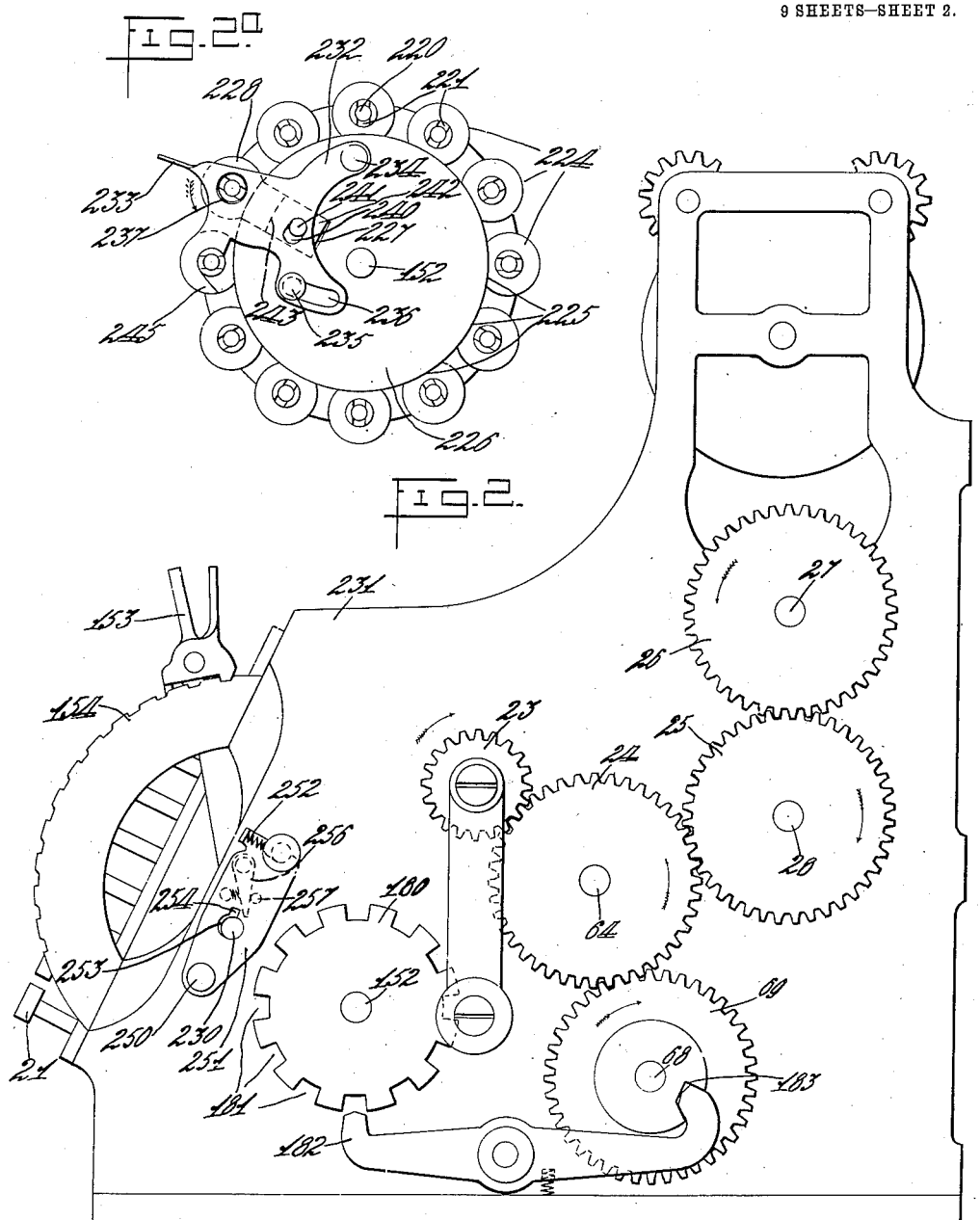

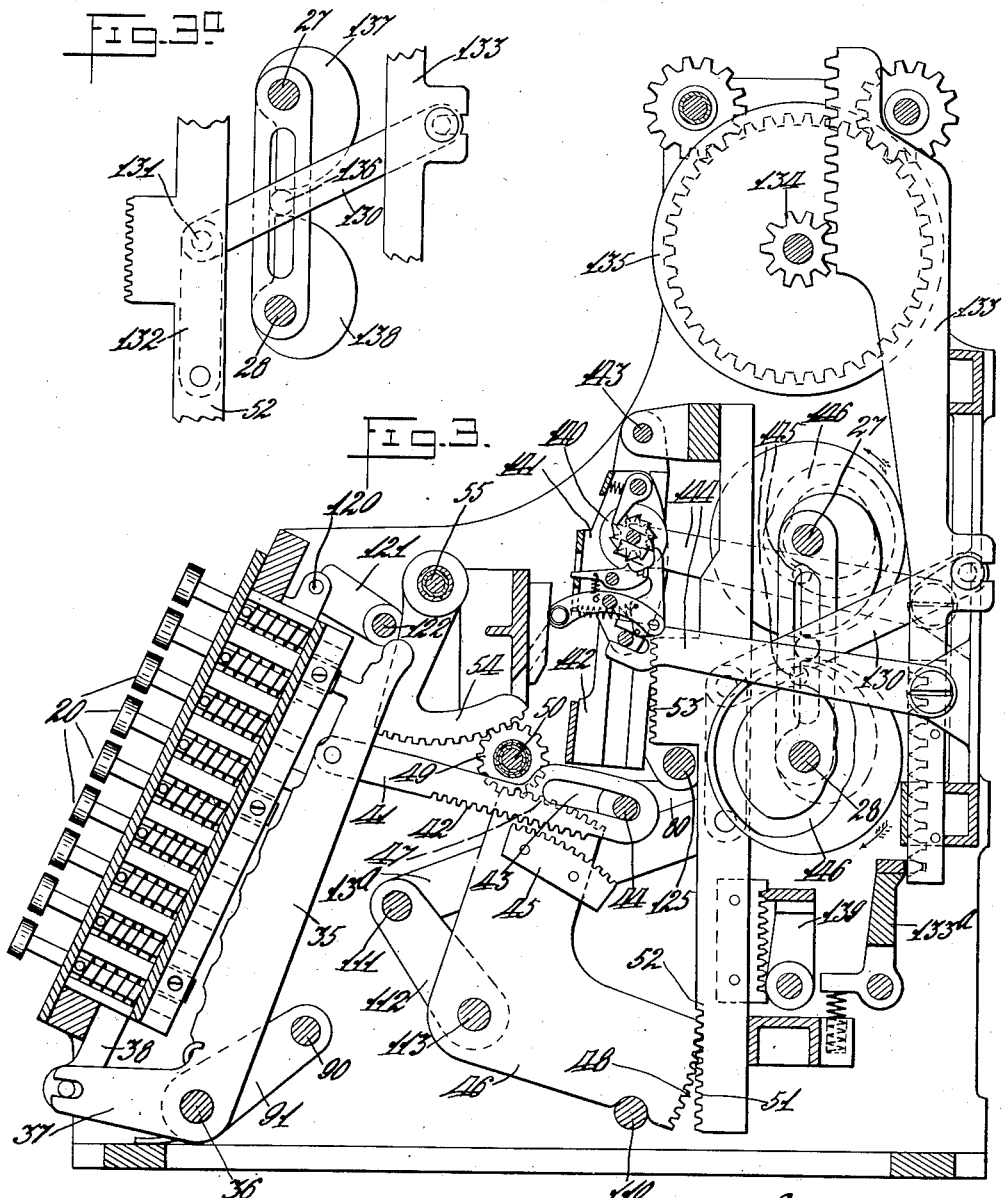

T. CARROLL.
CASH REGISTER.
APPLICATION FILED AUG. 5, 1905.
1,006,356.
Patented Oct. 17, 1911.
9 SHEETS—SHEET 4.
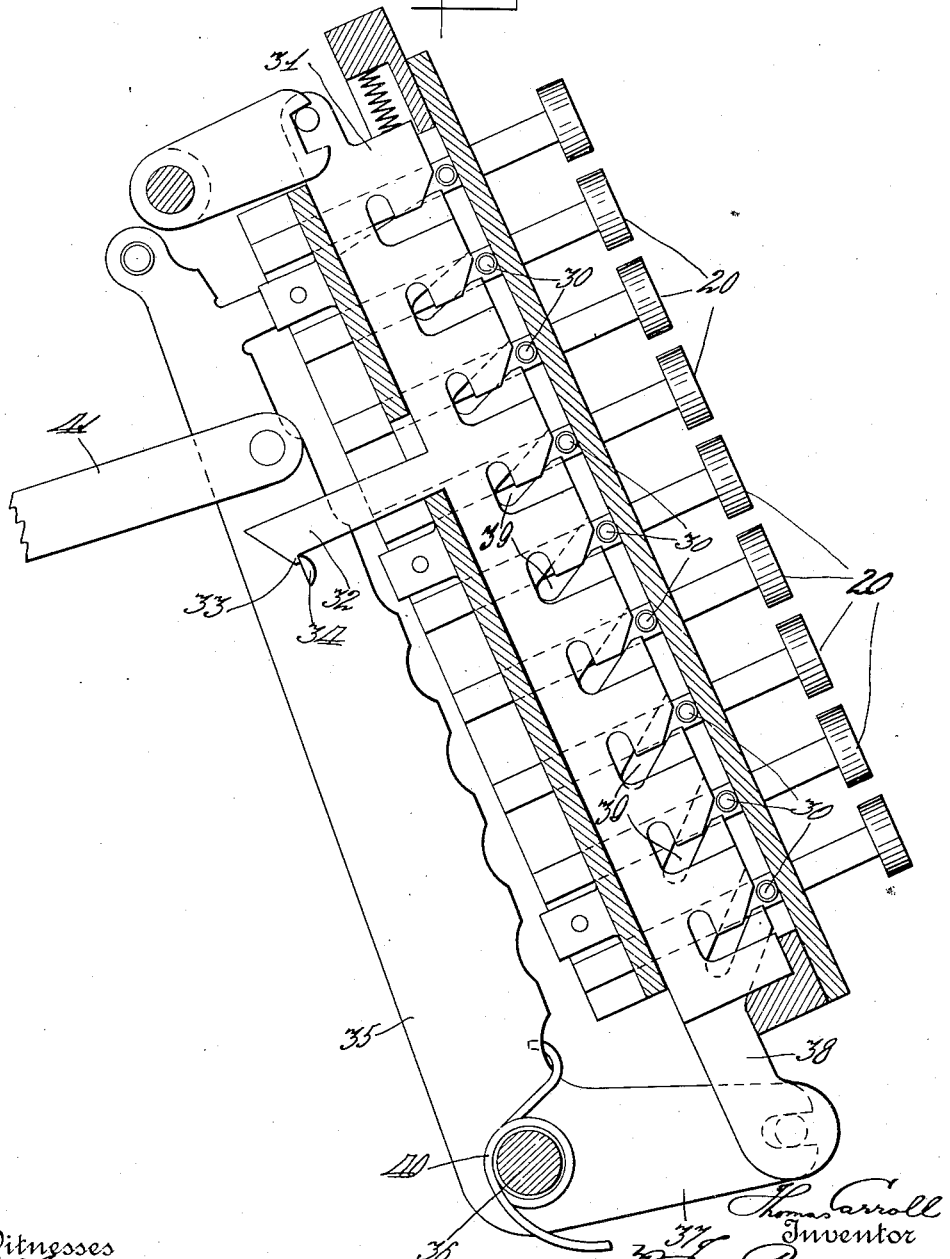

T. CARROLL.
CASH REGISTER.
APPLICATION FILED AUG. 5, 1905.
1,006,356.
Patented Oct. 17, 1911.
9 SHEETS—SHEET 5.
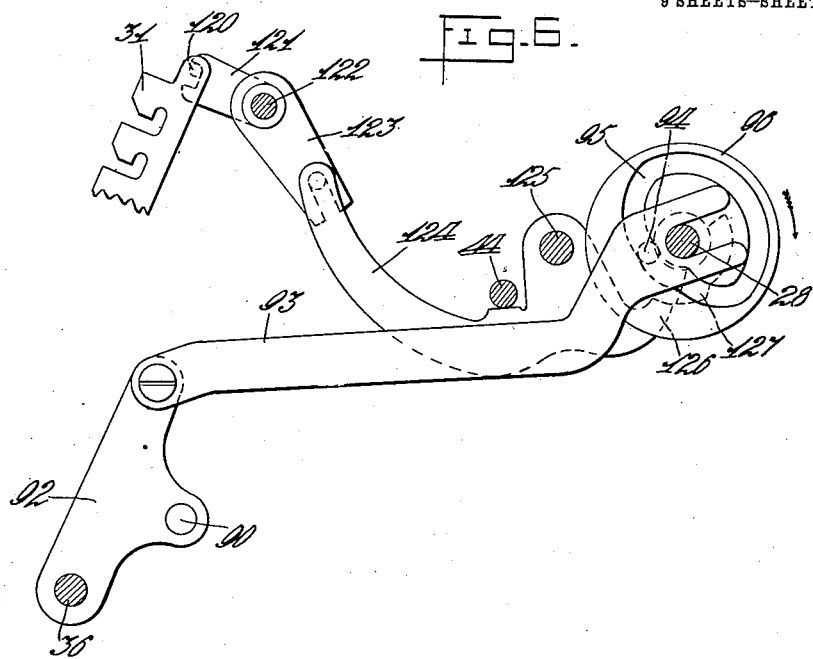
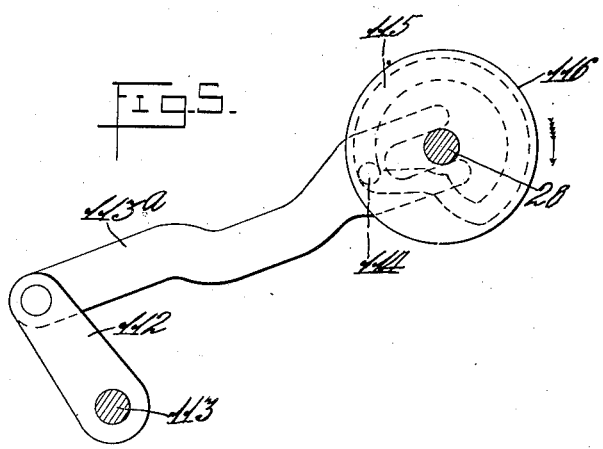

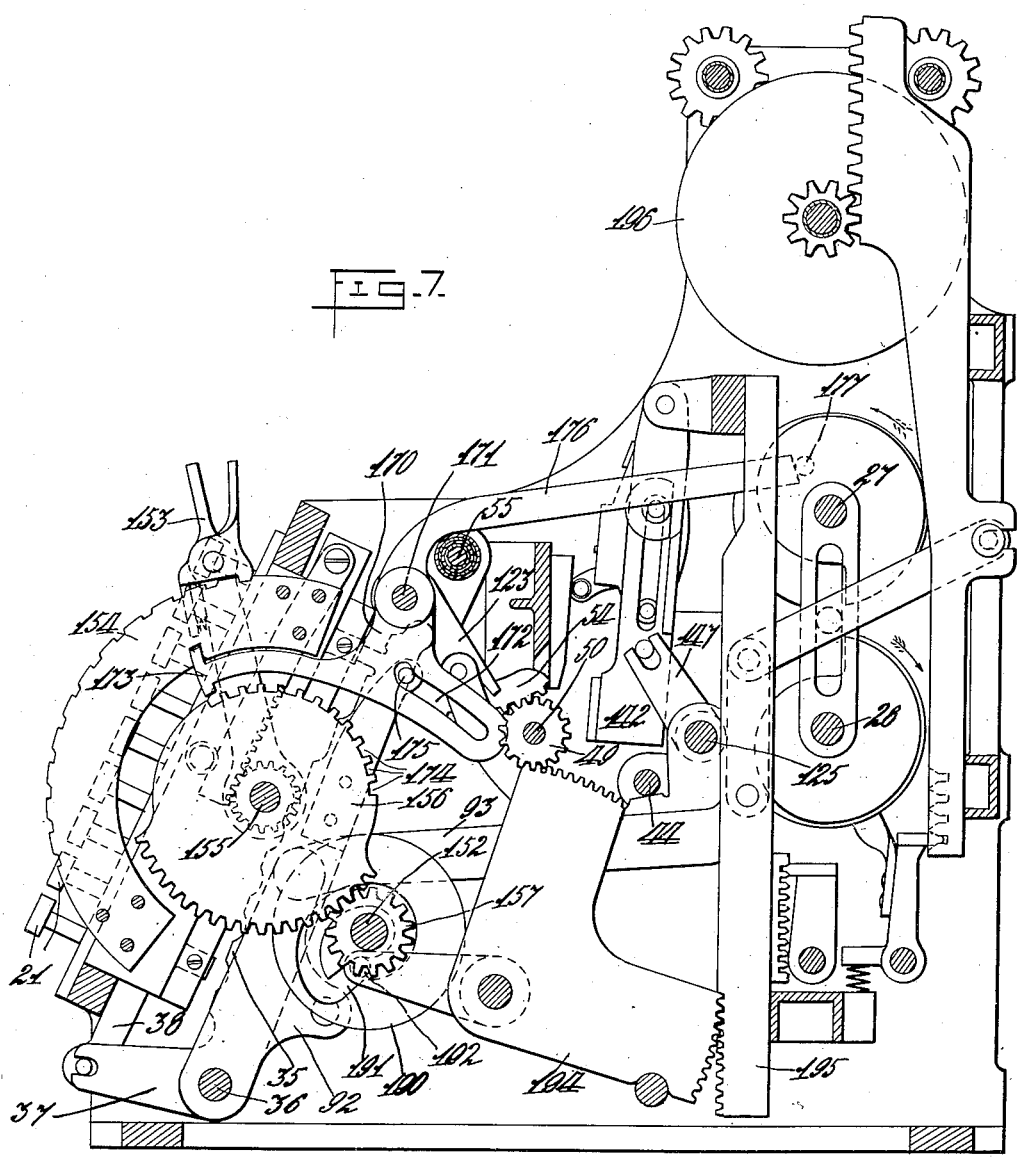

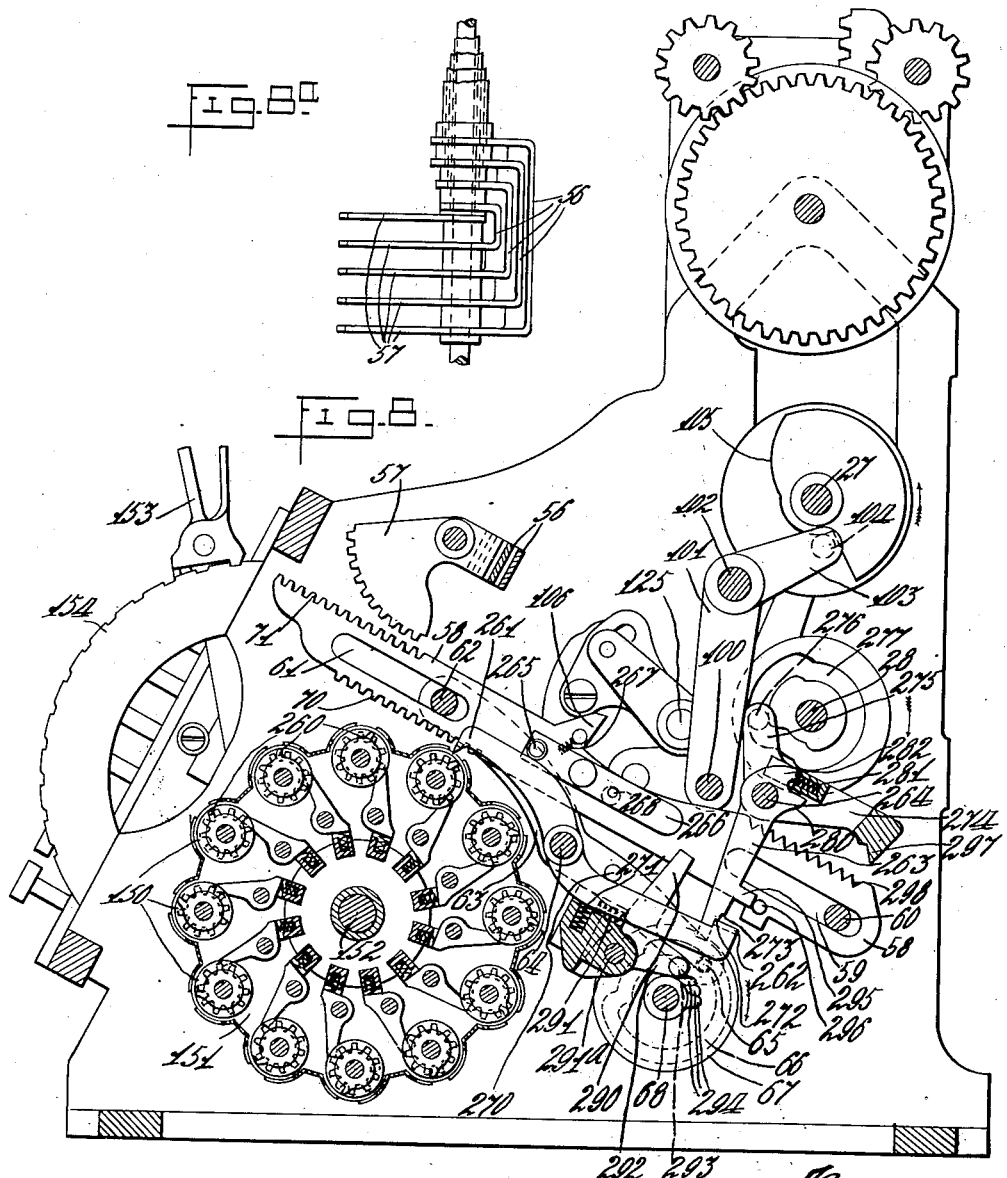

T. CARROLL.
CASH REGISTER.
APPLICATION FILED AUG. 5, 1905.
1,006,356.
Patented Oct. 17, 1911.
9 SHEETS—SHEET 8.
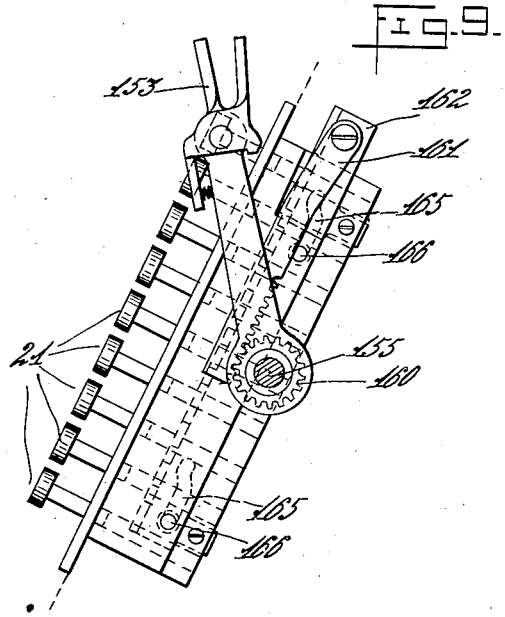
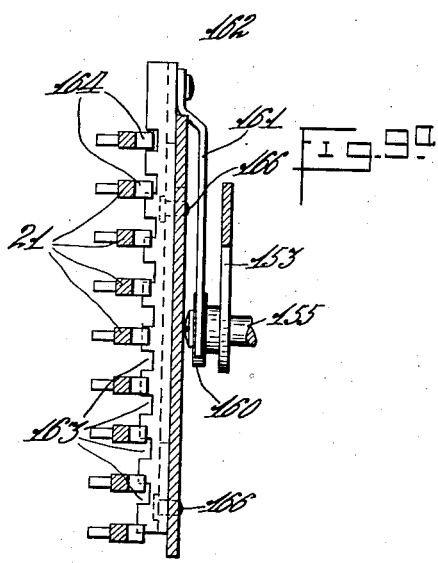
Witnesses
Thomas Carroll
Inventor
Attorneys T. CARROLL.
CASH REGISTER.
APPLICATION FILED AUG. 5, 1905.
1,006,356.
Patented Oct. 17, 1911.
9 SHEETS—SHEET 9.
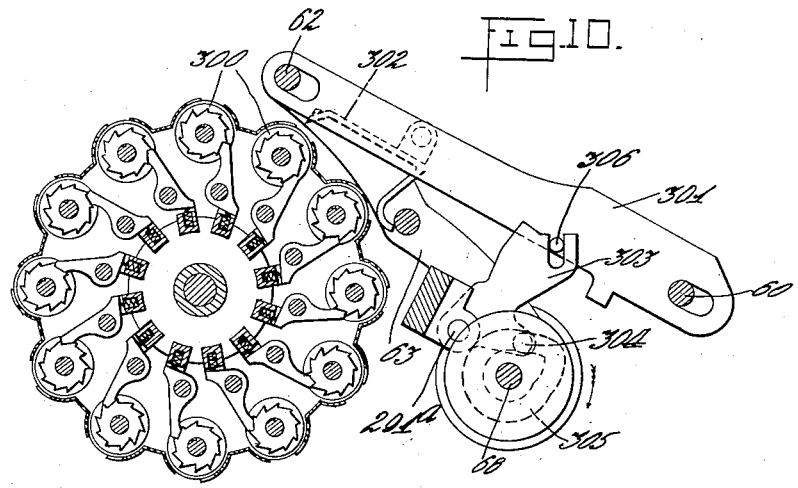
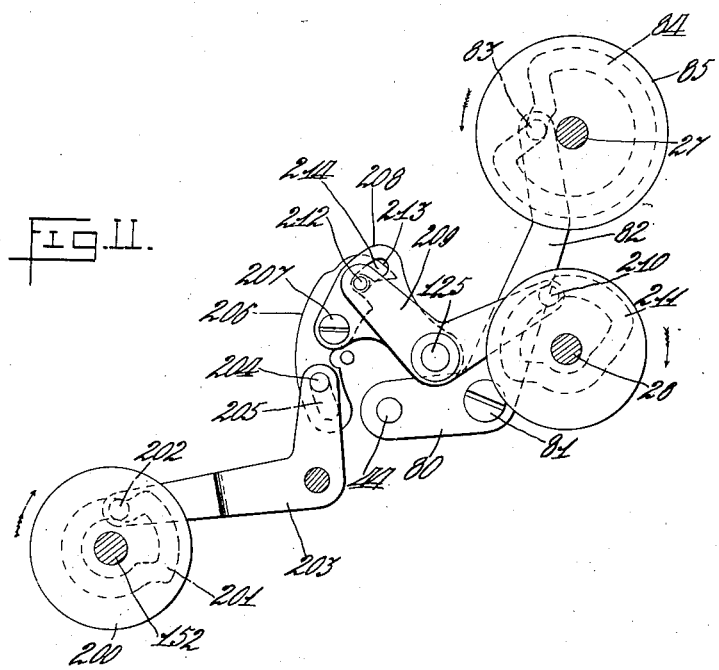

UNITED STATES PATENT OFFICE.

THOMAS CARROLL, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

1,006,356.   Specification of Letters Patent.   Patented Oct. 17, 1911.

Application filed August 5, 1905. Serial No. 272,832.

*To all whom it may concern:*

Be it known that I, THOMAS CARROLL, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash registers, certain of these improvements relating to the so-called "multiple counter" type of machine, and has among its objects to provide novel forms of devices in connection with the setting mechanism for actuating the accounting devices, also certain improvements relating to the operation of the various counters including certain locking mechanisms utilized therewith.

With these and incidental objects in view, the invention consists in certain novel features of construction and combinations of parts, the essential elements of which are set forth in appended claims and a preferred form of embodiment of which is hereinafter specifically described with reference to the drawings which accompany and form part of this specification.

Of said drawings: Figure 1 represents a front elevation of a cash register to which these improvements are applied. Fig. 2 represents a side elevation of the right-hand end of the machine. Fig. 2ª represents a detail side elevation of the multiple counter reel. Fig. 2ᵇ represents a detail view of the zero resetting key. Fig. 3 represents a vertical cross section of the machine approximately on the line 3—3 of Fig. 1. Fig. 3ª represents a fragmentary detail view of part of the indicator setting mechanism. Fig. 4 represents a detail vertical section of a portion of the key-board. Fig. 5 represents a detail view of one of the operating cams and connections for restoring certain of the parts connected with the setting mechanism. Fig. 6 represents a detail view of other restoring devices and the key release. Fig. 7 represents a vertical cross section of the machine approximately on the line 7—7 of Fig. 1. Fig. 8 represents a vertical cross section approximately on the line 8—8 of Fig. 1. Fig. 8ª represents a detail top view of certain nested yokes connecting parts of the setting mechanism. Figs. 9 and 9ª represent detail views of certain interlocking mechanism between the bank of clerks' keys and the multiple counter setting lever. Fig. 10 represents a detail view of the special counter actuating mechanism. Fig. 11 represents a detail view of the throwout counter mechanism.

Certain of the mechanisms associated with the improvements set forth in the present application are similar to those described in a co-pending application filed by the same applicant on Sept. 12, 1903, Serial No. 172,970, such for example as the indicator mechanism, and the setting and the operating mechanism for the grand total counter; but certain improvements have been incorporated in the present application in connection with the setting of the various differential elements which actuate the accounting devices, as well as different features associated with the multiple counter mechanism, the characteristic feature of which will be fully set forth presently.

The key-board is arranged in the ordinary manner with five banks of amount keys 20 (see Fig. 1) and a bank of clerks' keys 21. Power is applied to the machine by means of a crank handle 22 which as shown in Fig. 2 operates through gear wheels 23, 24, 25 and 26 to impart a complete revolution at each operation of the machine to an upper operating shaft 27 and a lower operating shaft 28, the direction of rotation of the various gears being shown by arrows.

*Setting mechanism.*—The shank of each key 20 carries a pin 30 (see Fig. 4) which coöperates with a detent plate 31 having the usual beveled nose and angle slot to hold the key in depressed position. This detent plate 31 carries a rearwardly projecting arm 32 formed with a latching nose 33 which engages over a lug 34 formed upon the side of a bell crank lever 35 which is pivoted loosely upon a transverse shaft 36 and has a forwardly extending arm 37 having a slot and pin connection with a sliding stop plate 38, which plate is formed with a series of slots 39, one for each of the key pins 30. It will be seen that these slots 39 are inclined at different angles so as to give different extents of movement to the stop plate when any key is depressed and its pin enters said slot. A spring 40 presses against the aforesaid lever 35 so that it tends to throw the upper arm of the same rearward. When any key is depressed the operation of its detent plate 31 releases the latch from the lug 34 and permits the lever 35 to spring rearward under its spring tension. The consequent upward movement of the arm 37 slides the stop plate 38 vertically upward and as the key continues its depression the pin thereof enters the slot 39. The stop plate 30 is of course limited in its movement by the final setting of the key at the bottom of its slot 39, so that the differential inclinations of said slots will result in the differential movements of the lever 35 according to the key depressed. It will be observed from Fig. 4 that for the key pin 30 of the highest key in the bank (which is the 1 key), there is no slot 39 but the stop plate 38 simply ends at this point and its upper end is slightly inclined so that upon the movement of the 1 key the stop plate may move sufficiently to cause the lever to be set for one degree of movement.

The inner ends of the key shanks may be so arranged with reference to the lever 35 that they will strike said lever and move the same positively to differential extents, the extent of movement of course being absolutely limited by the stop plate 38; but the presence of the spring 40 takes the work off of the keys in that as soon as the key is depressed and the lever 35 unlatched the spring 40 tends to set the lever to proper position without requiring the added pressure on the keys to effect this setting movement. There is one of these setting levers 35 for each bank of keys and for convenience they will be designated as the primary setting elements, the mechanism being such as to restore these elements to normal position after they have been set differentially by the keys and this movement of restoration is utilized to set secondary setting elements as will now be set forth.

Situated near the upper end of each of the levers 35 is a link 41 (see Fig. 3) formed on its lower side with rack teeth 42 and also provided with a slot 43 through which extends a transverse vibrating rod 44. Teeth 42 are arranged to mesh with a segmental plate 45 fast upon the side of a bell crank segment 46 having at its upper end a segmental rack 47 and at its lower end another segmental rack 48. The rack 47 meshes with a pinion 49 carried by a sleeve on a transverse shaft 50, there of course being one of these pinions 49 for each bank of keys and if it is desired their sleeves may extend through one side of the machine to serve as connections for operating the type wheels but such a printing attachment will not be described in the present case since it constitutes no part of the present invention.

The aforesaid segmental racks 48 mesh with teeth 51 on the lower end of the vertical setting bar 52 near the forward upper end of which is a rack bar 53 arranged to actuate the main total counter as will be later described, and this same bar 52 is also utilized to effect the setting of the corresponding indicator. Meshing with each pinion 49 is an intermediate segment 54 mounted upon a sleeve turning on a transverse shaft 55. As shown in Fig. 8ª these sleeves are connected by nested yokes 56 with setting gears or segments 57 (see also Fig. 8). Below these setting gears 57 are a series of rack bars 58 (see Fig. 8). The rearward end of each bar 58 is formed with a slot 59 surrounding a transverse shaft 60 which acts as a guide and support for the rack bar, and the forward end of the bar is formed with a slot 61 through which extends a transverse vibrating rod 62. This rod extends transversely between two arms of a rocking frame, one of these arms 63 being shown partly in dotted lines in Fig. 8, and pivoted upon a transverse shaft 64. The downwardly extending portion of the arm 63 carries a pin 65 projecting into a cam groove 66 formed in a disk 67 fast upon an operating shaft 68, which shaft as shown in Fig. 2 receives a complete revolution at each operation of the machine by means of the gear wheel 69 which meshes with the aforesaid gear wheel 24. These rack bars 58 are for the purpose of actuating any desired one of a series of multiple counters as will later be described, and on the lower side of each rack bar is a rack 70 for operating such multiple counters and on the upper side is a rack 71 adapted to mesh with the aforesaid setting gears 57. In the normal position of rest of the machine, the rack 71 is out of mesh with its corresponding setting gear 57; but upon the operation of the machine, the rotation of the shaft 68 causes the disk 67 to act upon the arm 63 and raise the vibrating cross rod 62 so as to throw the racks 71 into mesh with the setting gears 57 at a certain point in the operation of the machine so that these rack bars 58 will then be enabled to partake of the setting movement of the setting gears 57.

The means for giving the setting movement to the gears 57 is as follows: The aforesaid vibrating cross rod 44 (see Fig. 3) is carried between the arms 80 of a rocking frame which as shown in Fig. 11 is pivoted at 81 and is operated by means of an arm 82 extending upward therefrom and carrying a pin 83 projecting into a cam groove 84 formed in a disk 85 fast upon the upper operating shaft 27. Normally the vibrating rod 44 stands in its upper position so as to maintain all of the links 41 raised so that their rack teeth 42 are out of mesh with the segmental plates 45, and thus when any key is depressed and the primary setting elements or levers 35 are carried rearward, the links 41 will be carried rearward certain differential extents according to the keys depressed; now upon the operation of the machine, the cam groove 84 operates to vibrate the cross rod 44 downward and thereby carry the rack teeth 42 into mesh with the segmental plates 45 so that the links 41 are thereby locked to the bell crank segments 46. The primary setting levers 35 are now positively restored to normal position by means of a transverse shaft 90 extending between an arm 91 pivoted loosely upon the aforesaid transverse shaft 36 and an arm 92 (see Fig. 6) also pivoted loosely upon said shaft 36. This arm 92 has attached to it a link 93 carrying at its rearward end a pin 94 running in a cam groove 95 formed in a disk 96 fast upon the lower operating shaft 28, the shape of the cam groove being such that upon the operation of the machine the arm 92 and cross rod 90 are rocked forward and thereby any levers 35 which have been operated and carried rearward differentially, are now positively restored to normal forward position; and since the links 41 are at this time coupled to the bell crank segments 46, these segments are moved to a distance exactly corresponding to the extent of movement of restoration of their corresponding setting levers 35. This differential extent of movement of the bell crank segment 46 serves to set the vertical bar 52 differentially and likewise through the pinion 49, intermediate gear 54, yoke 56 and setting gear 57 serve to set the secondary setting element or rack bar 58 differentially to the same extent, the said rack bar 58 having at this time been thrown up into mesh with said setting gear 57. Thus it will be seen that, the secondary setting elements or rack bars 58 are set differentially to distances corresponding to the values of the keys depressed, through the process of restoring the primary setting elements or levers 35 to normal zero position, which restoration is effected by the operation of the machine, so that in this manner the secondary setting elements do not have to be set by the actual force applied by the depression of the key but are set subsequently upon the operation of the machine, and now by throwing these secondary rack bars 58 out of mesh with their setting gears 57, these rack bars 58 may then in turn be restored to normal zero position, and by throwing the rack bars into mesh with their accounting devices which in this case are the multiple counters presently to be described, this restoration of the secondary setting elements 58 to normal position may be utilized to actuate said accounting devices. This restoration of the rack bars 58 to normal position is effected by means of a vibrating rod 100 (see Fig. 8) carried between arms 101 extending downward from the transverse shaft 102, and an arm 103 carrying a pin 104 is acted upon by a cam disk 105 fast upon the upper revolution shaft 27 to cam the arm 103 downward and the vibrating cross rod 100 forward at each operation of the machine to restore the rack bars 58 by striking against a projection 106 extending upward therefrom, this restoration of course taking place subsequent to the rearward differential setting movements of said racks. As soon as the arm 103 has been cammed downward in this manner, the weight of the vibrating rod 100 and its supporting arms cause the arm 103 to return to normal upper position as shown in Fig. 8 as soon as the disk 105 has been given a complete rotation. The aforesaid bell crank segments 46 are also restored to normal position at each operation of the machine, with their lower sides resting upon the transverse shaft 110 as shown in Fig. 3. This restoration to normal position is effected by means of a vibrating rod 111 carried between arms 112 pivoted upon the same shaft 113 to which the segments 46 are mounted. As shown in Fig. 5 there is attached to one of these arms 112 a link 113ᵃ which at its rearward end carries a pin 114 extending into a cam groove 115 formed in a disk 116 fast upon the lower operating shaft 28, so that upon the operation of the machine the cross rod 111 will be drawn rearward to restore the segments 46 to normal position against the cross bar 110, and then the rod 111 is immediately thrown forward again to permit the differential movements of said segments 46 when the setting levers 35 are restored to normal position in the manner above described. It will be obvious that this restoration of the segments 46 to normal position also acts through the pinions 49 and intervening connections to restore the setting gears 57 to normal position and the operation of the various parts is so timed that this restoration of the segments 46 takes place at the initial part of the operation of the machine before the links 41 are thrown into mesh with said segments and before the secondary setting elements 58 are thrown into mesh with their setting gears 57. As soon as the segments 46 and setting gears 57 are restored to normal position in this manner, the vibrating rod 44 is operated as above described to connect the levers 35 to the segments 46, and the vibrating rod 62 is operated to carry the rack bars 58 into mesh with their segments 57 so that the aforesaid setting movements of said rack bars 58 will now take place in the manner described. As soon as this setting movement of the rack bars 58 has been effected, said rack bars are then carried downward by the vibrating rod 62 into mesh with the particular one of the multiple counters which has been brought into position to be operated in the manner to be presently described, and after such operation of the multiple counter the rack bars 58 are finally thrown out of mesh with said counters so as to permit the setting movements of said rack bars upon the next operation of the machine, the normal position of said rack bars 58 being as shown in Fig. 8.

*Key release.*—Since it is necessary to release the depressed keys before the setting levers 35 can be restored to normal position, a key release mechanism is provided as follows: For each key detent 31 (see Fig. 6), there is a pin 120 projecting from the end of the same and extending between the jaws of a rock arm 121 fast to a rock shaft 122. Extending downward from this rock shaft is an arm 123 formed with a slot into which projects a pin on the upper end of a curved lever 124 hung loosely upon a transverse shaft 125. When the aforesaid vibrating rod 44 is rocked downward in the manner previously described to carry the links 41 into mesh with their segment plates 45, this cross rod 44 strikes the aforesaid lever 124 and thereby operates through an arm 123 to rock said shaft 122 and thereby rock all of the arms 121 upward to release the key detent 31 from engagement with their depressed keys and allow the keys to spring back to their normal positions. It will also be apparent from Fig. 6 that when any key is depressed, the shifting of its detent plate will rock the shaft 122 and thereby throw the rearward end 126 of the lever 124 into the path of a projection 127 fast upon the upper revolution shaft 28 so as to lock said shaft of the machine from operation while a key is being depressed. Of course when the key detent returns to normal position to latch the key in depressed position the lever 124 returns to normal position when its end 126 is out of the path of the projection 127 thus permitting further operation of the machine as soon as the key is completely depressed.

*Indicator mechanism.*—The indicator mechanism is such as to provide for the movement of the rotary indicators from one differential position to another without the necessity of the return of the indicators to zero position at each operation. A link 130 (see Figs. 3 and 3ª) is pivotally attached to the upper end 131 of a swinging link 132 pivoted upon the side of the rack arm 52. The rearward end of the link 130 is pivoted to an indicator rack bar 133 carrying at its upper end a rack meshing with a pinion 134 fast upon the side of a corresponding indicator 135, and suitable cross gearing being provided for indicating at the front and at the back of the machine. At the middle of the link 130 is a pin 136 and this pin is acted upon by two cams one of which 137 is fast to the upper operating shaft 27 and the other of which 138 is fast to the lower operating shaft 28. As soon as the rack bar 52 is positioned by the setting of its corresponding segment 46 as previously described, the rack bar is locked in adjusted position by an alining pawl 139, and then the operation of the machine causes the cams 137 and 138 to bring the pin 136 to a certain fixed point so that the rearward end of the lever is positioned differentially according to the position which the forward end of the lever has assumed by the setting of the rack bar 52, and in this manner the indicators are set differentially to positions controlled by the setting of the rack bars 52 which positions correspond to the values of the keys depressed. This indicator setting mechanism is fully described in the aforesaid co-pending application and it is thought the same will be fully understood without further reference thereto in the present application. The locking pawl 139 is suitably actuated by mechanism not shown herein to lock the rack bars 52 in set positions and unlock the same at the proper points in the operation of the machine. Alining pawls 133ª are also provided for locking the indicator rack arms 133 in position at the proper time, the mechanism for operating these pawls not being shown herein but being of any ordinary and suitable form.

*Grand total counter.*—The grand total counter comprises a series of registering wheels 140 (see Fig. 3) which are mounted in a vertically reciprocating carriage 141 which carriage of itself slides in an oscillating frame 142 pivoted to swing upon the point 143. The counter carriage 141 is reciprocated down and up at each operation of the machine by means of arms 144 suitably pivoted at the rear of the machine and carrying pins 145 extending into cam grooves 146 formed in disks fast upon the aforesaid operating shafts 27 and 28 so that upon each operation of the machine the counter is carried down over the aforesaid rack bars 53 and the counter is actuated to the extent corresponding to the differential positions of said rack bars 52. The counter is thrown into engagement with the rack teeth 53 upon the downward reciprocation of the counter and is thrown out of engagement upon the upward reciprocation, this engagement and disengagement being effected by the swinging of the entire frame 142 which is effected by means of an arm 147 (see Fig. 7) fast upon the rock shaft 125, which shaft is suitably rocked at each operation of the machine to swing the frame 142 rearward and carry the counter into engagement with these actuating racks. This general method of setting these rack arms 52 and operating the counter in this manner by carrying the same downward over the racks is similar to that set forth in the patent issued to Thomas Carroll, No. 751,611, dated Feb. 9, 1904, and reference may be had to said patent for a fuller description of the details of the counter mechanism. This rocking of the shaft 125 to carry the counter frame 142 rearward so as to cause the total counter to be actuated by the rack teeth 53, is effected by mechanism shown in Fig. 11 which mechanism will however be described subsequently in connection with the throwout mechanism controlled by the adjustable lever which positions the multiple counters for operation, the arrangement being such that when certain of the multiple counters are brought into operative positions for the registering of special transactions which do not represent cash transactions, the grand total counter would be thrown out of operation so that said counter will represent simply the grand total of cash transactions.

*Multiple counters.*—The multiple counters comprise a plurality of independent registering wheels arranged in sets each of which constitutes a counter, these counters 150 (see Fig. 8) being arranged around the outside circumference of a circular carriage or reel 151. This reel is mounted to turn upon an axis 152 and is rotated by means of a differentially adjustable setting lever 153 moving over a scale 154 provided with notches for the different setting positions. This lever is mounted upon a stub shaft 155 (see Fig. 7) and carries a circular disk 156 formed on its lower periphery with a segmental rack meshing with a pinion 157 fast upon the axis of the multiple counter reel so that the movements of the lever 153 will position the reel and bring any desired one of the plurality of counters into position to be actuated by the aforesaid setting racks 58. In the present instance these counters are shown twelve in number, nine of the same being adapted to give separate totals for the transactions of nine clerks and the other three counters being for the purpose of securing totals of the special transactions such as " Charge," " Received-on-account," and " Paid out."

The aforesaid clerks' keys 21 (see Fig. 1) are nine in number and for each clerk's key there is a corresponding setting position of the multiple counter setting lever 153, beginning with the top notch of the plate 154 for clerk "A", the second notch for clerk " B " and so on, this extent of movement of the lever 153 being sufficient to bring the various clerks' counters into proper position to be actuated. In order to compel the operation of the clerk's key 21 corresponding to the setting position of the lever 153, the interlocking mechanism shown in Figs. 9 and 9ª is provided. Fast to a collar surrounding the aforesaid stub shaft 155 and rigidly connected to the lever 153 is a pinion 160 which meshes with a rack bar 161 pivoted upon the upper end of a key detent plate 162. This key detent plate 162 is formed with a series of notches 163 and in the normal position of the plate as shown in Fig. 9ª only one of these notches is in alinement with its corresponding pin 164 projecting from the side of the shanks of the clerks' keys 21. When however the lever 153 is moved from its upper position in which only clerk A's key can be depressed, the movement of the rack bar 161 shifts the detent plate 162 longitudinally in the direction of its own length and thus brings the second notch of this plate in alinement with the projection 164 of clerk B's key so that clerk B's key can now be operated when the lever stands opposite clerk B's notch on the scale 154 while all the other notches are out of alinement with their respective key pins 164. This same condition obtains for each one of the different positions of the setting lever 153 corresponding to the nine clerks so that all the clerks' keys are locked except the one corresponding to the setting position of the lever. However since it is desirable when the setting lever is set for the registration of any one of the special transactions, to permit the operation of any one of the clerks' keys in conjunction therewith, mechanism is provided which accomplishes this purpose as follows. The detent plate 162 is formed at each end with cam slots 165 which are engaged by stationary pins 166 which serve to guide the plate in its longitudinal movements. When however the setting lever 163 has been turned so far toward its lower position as to get beyond the region of the nine clerks' positions, the detent plate 162 at this point is shifted so far forward that the bent portion of the slot 165 now comes in contact with the pins 166 and the entire detent plate 162 is thereby depressed transversely to its own length, and this extent of depression is enough to carry the entire detent plate below the path of travel of the aforesaid key pins 164 so that any one of the clerks' keys can now be operated in conjunction with the operation of any one of the special transaction counters.

In order to lock the setting lever when any one of the clerks' keys is depressed, mechanism is provided shown in Fig. 7, comprising a locking lever 170 pivoted at 171 and formed at its rearward end with a slot 172 having a short bent portion at the forward end of the slot, and the forward end of the locking lever is provided with a locking head 173 arranged to coöperate with a series of locking notches 174. There is a setting lever 35 for the bank of clerks' keys 21, and the upper end of this lever carries a pin 175 which projects into the aforesaid slot 172, and when any one of the clerks' keys is depressed, the rearward movement of the lever 35 causes the pin 175 to act upon the locking lever 170 upon the initial movement of this clerk's setting lever 35 so as to raise the rearward portion of the locking lever and depress the locking head 173 into engagement with the particular notch which has been brought into alinement therewith according to the setting position of the lever 153, and thus as soon as a clerk's key has been started to be depressed, the multiple counter setting lever is securely locked in position. This same locking lever 170 has extending rearwardly therefrom an arm 176 which normally stands in the path of a pin 177 carried upon a disk fast upon the upper revolution shaft 27 so that this arm 176 normally locks the shaft 27 from movement and thus locks the machine until one of the clerks' keys is depressed whereupon the arm 176 is withdrawn from locking position in front of the pin 177 upon the rocking movement of the locking lever 170.

In order to lock the multiple counter reel as soon as the machine has started, the devices shown in Fig. 2 are provided comprising a locking disk 180 fast upon the shaft 152 which carries the multiple counter reel, this disk being formed with notches 181 arranged to be engaged by a locking pawl 182 the rearward end of which extends into a notch 183 formed in a disk fast upon the aforesaid shaft 68 so that upon the operation of the machine the rearward end of the locking pawl 182 will be forced out of the notch 183 and the forward end will engage whichever notch 181 has been brought into alinement therewith according to the setting position of the lever 153 so that the multiple counter reel will thereby be securely locked until the machine has been completely operated when the pawl 182 again springs back to normal position shown in Fig. 2.

For the purpose of setting a special indicator in connection with the movement of the multiple counter setting lever 153 to any one of the three lower positions representing the three special transactions "Received on account," "Charge" and "Paid out", the aforesaid shaft 152 upon which the multiple counter reel is mounted has fast upon it a disk 190 Fig. 7 formed with a cam groove 191, into which projects a pin 192 carried upon an arm 193 which arm is fast to a bell crank segment 194 similar to the previously described bell crank segments 46 which are utilized in connection with the amount keys. This bell crank segment 194 meshes with a rack bar 195 for the purpose of setting the special indicator 196, and the method of setting the indicator is the same as that previously described in connection with the setting of the amount indicators; but it will be observed that the shape of the cam groove 191 is such that the arm 193 is not cammed downward until the setting lever 153 has been rotated far enough to bring the lever to the first one of the three lower positions, and then the segment 194 is moved differentially for these three lower positions of the lever 153 according to whichever of these three positions the lever may occupy, and thereby the bell crank segment 194 is positioned to prepare for the setting of the special indicator to display the proper indication to correspond with the special transaction setting position of the lever 153.

*Throwout counter.*—Since the above mentioned three special transactions are not cash received transactions, it is desirable to throw out the grand total counter when the setting lever 153 is moved to any one of such three lower positions, and this is accomplished by means of the mechanism shown in Fig. 11, comprising a disk 200 fast upon the aforesaid shaft 152 which carries the multiple counter reel, which disk is formed with a cam groove 201 into which projects a pin 202 carried upon the forward end of a bell crank lever 203 the upper end of which bell crank lever carries a pin 204 projecting into a slot 205 formed in the lower end of a coupling lever 206. This coupling lever is pivoted at its middle point 207 to the enlarged head of an arm 208 which is fast to the aforesaid rock shaft 125 which as previously described in connection with Fig. 7 carries the arm 147 for throwing the grand total counter frame 142 rearward to cause the counter to mesh with the operating racks 53. Pivoted loosely upon this same shaft 125 is a bell crank lever 209 (see Fig. 11) the rearward end of which carries a pin 210 projecting into a cam groove 211 formed in a disk fast upon the lower operating shaft 28; and the forward end of this bell crank lever carries a pin 212 which projects loosely through a slot 213 formed in the enlarged head of the arm 208. The aforesaid coupling lever 206 is formed at its upper end with a hook 214 adapted to engage the aforesaid pin 212 when the parts are in the position shown in Fig. 11. When the parts are in such position, the operation of the machine will cause the rearward end of the bell crank lever 209 to be lowered and this will raise the forward end so that the pin 212 being engaged by the hook 214, will lift upon the coupling lever 206 and since this lever is pivoted to the enlarged head of the arm 208 which is fast to the aforesaid rock shaft 125, this results in the rocking of said shaft to rock the arm 147 (see Fig. 7) to carry the grand total counter into mesh with its operating racks and then carry the counter out of mesh upon the return reciprocation of the counter. When however the multiple counter setting lever 153 is turned to any one of the three lower positions for the special transactions, the disk 200 is turned to such position that the forward end of the bell crank lever 203 will be cammed upward and the coupling lever 206 will be swung about its pivotal point so as to uncouple its upper hook end 214 from engagement with the pin 212, so that now upon the rocking of the bell crank lever 209, the pin 212 will no longer engage said coupling lever and of course will thereby have no effect upon the arm 208 but will simply slide idly upward in the slot 213 in said arm without having any rocking effect upon the rock shaft 125 so that the grand total counter will not be rocked into engagement with its operating racks and thus will not be operated in connection with the registration upon any one of the special transaction multiple counters.

*Zero resetting mechanism.*—In order to reset to zero the various counters which are mounted upon the multiple counter reel as previously described, the reel is rotated to bring each one of the counters successively into a particular position where access may be had to the same for the purpose of resetting it to zero, all of which mechanism and the various locking devices connected therewith will now be described. As shown in Fig. 2ª, each counter is mounted upon its turn-to-zero shaft 220, the end of this shaft being formed with slots 221 adapted to receive the projections 222 (see Fig. 2ᵇ) formed on the end of the zero resetting key 223 so that when the projections engage said slot the turning of the key will rotate the zero resetting shaft 220 and said shaft is provided with the well known groove construction coöperating with spring-pressed pawls on the counter wheels to pick up said pawls and reset all of the counter wheels to zero when the zero resetting shaft is given a complete rotary movement, this particular mechanism not being shown herein as it is already well known in the art. The end of each zero resetting shaft 220 has fast upon it a locking disk 224 formed with a cut away portion 225 which conforms to the circular periphery of a disk 226 which disk is stationary being co-axially mounted with reference to the multiple counter reel and serves as a controlling disk to control the resetting of the various counters to zero. This disk is formed with a rectangular cut away portion 227 which is of such width that when the multiple counter is rotated to bring any particular counter into position in alinement with said recess 227, such for example as the counter 228 in Fig. 2ª, then the locking disk 224 of this counter is no longer locked by the periphery of the controlling disk 226 and consequently the counter may be reset to zero. When a counter is thus brought into position to be turned to zero, access to the zero resetting shaft is had through an aperture 230 (see Fig. 2) formed in the inclosing casing or side frame 231 of the machine, but this aperture 230 is arranged to be closed by a guard 232 having an operating handle 233 and being pivoted at 234 to the aforesaid stationary disk 226. The guard is guided in its oscillatory movements about its pivotal point by means of a pin 235 playing in a slot 236 formed in said guard. The guard is also formed with an aperture 237 and when the guard is thrown into the position shown in Fig. 2ª this aperture is brought opposite the zero resetting shaft for the particular counter which stands in alinement with the aforesaid recess 227, so that the zero resetting key may be inserted through the aperture 230 formed in the inclosing casing and also through the aperture 237 formed in the guard and thus the counter may be reset to zero. When however the guard is thrown to its upper position, the solid portion of the guard closes the aperture 230 in the casing and prevents access being had to the counter to reset the same to zero. The guard 232 is also formed with a slot 240 into which projects a pin 241 formed on a sliding block 242. This block slides in the aforesaid rectangular recess 227, and it will be seen from Fig. 2ª that when the guard is in the lower position permitting access to the particular counter brought into alinement with said recess 227, the block 242 is at the lower end of said recess and the upper edge 243 of said block is so far below the locking disk 224 of this counter 228 that it does not present any obstruction to the zero resetting movement of this particular counter. When however the guard is moved to its upper position, the swinging movement of the guard will cause the block 242 to travel outward in the recess 227 until the upper edge 243 reaches the cut away portion of the locking disk 224, this in fact filling out the periphery of the controlling disk 226 so that now it is impossible for the counter to be reset to zero even though access could be had to the zero resetting shaft by other means, and furthermore the filling out of the periphery of this disk 226 by the block 242 prevents the various counter disks 224 from catching on the walls of the recess 227 when the counter reel is operated.
Thus it will be seen that the controlling disk 226 is common to all of the counters to prevent rotation of their zero resetting shafts except for the one counter which is in alinement with the recess 227 provided said recess is free from obstruction by reason of the guard having been lowered to depress the block 242; and of course each counter as it is moved into position to be operated upon by the previously described operating racks also has its zero resetting shaft locked by this common controlling disk 226. The guard 232 is also formed with a hook 245 (see Fig. 2ª) which when the guard is moved to lower position to permit the resetting to zero of the counter, engages over the zero resetting shaft of the counter directly below the counter which has been positioned for zero resetting, and by locking this counter to the guard, the entire reel is locked from movement so that the setting lever cannot be rotated.

In connection with the resetting to zero of the various multiple counters it is desirable to have some means which will compel a rotation of the zero resetting key to a slight extent beyond the normal full rotation so as thereby completely to insure the wheels being all returned to proper zero positions. The mechanism for accomplishing this and certain other purposes is shown in Fig. 2. Pivoted at 250 upon the inclosing casing of the machine is a plate 251 which is spring-pressed forward by means of a spring 252. This plate is formed with a circular aperture 253, this aperture however being still further cut away at 254 in a rectangular formed notch which notch is just wide enough to permit the passage therethrough of the pin 255 (see Fig. 2$^b$) formed on the side of the zero resetting key 223. Thus when the resetting key is inserted into the aperture 253 of the pivoted plate 251, the key has to be in such position that the pin 255 is in alinement with the notch 254. There is a slight space between said pivoted plate 251 and the side frame 231 so that as soon as said key pin 255 has passed through the notch 254 the key pin may rotate freely between the inner side of said plate and the outer side of said side frame; but in order for the projections 222 of the zero resetting key to be brought properly into alinement with their corresponding notches 221 formed in the zero resetting shaft, it is necessary to give the key a slight turning movement toward the right or clockwise in Fig. 2, in which event the aforesaid pin 255 strikes a spring-pressed pawl 256 pivoted upon the inner face of the pivoted plate 215, and the bearing of the pin 255 against this pawl 256 forces the pawl against a stop pin 257 projecting from the plate 251 and this causes the swinging rearward and downward of the entire pivoted plate 251. Of course this swinging movement is very slight and just enough to permit the key properly to engage the turn-to-zero shaft, and as soon as this engagement has been effected the key is rotated toward the left in the direction of the arrow shown on counter 228 in Fig. 2$^a$, so that the pin 255 is now withdrawn from contact with the pawl 256 and the plate 251 is free to spring forward to normal position, but this brings the notch 254 back to normal position so that upon the complete rotation of the zero resetting key the notch 254 would be a slight distance in advance of the key pin 255 so that the key cannot be removed until the key is rotated a slight movement farther to bring the key pin 255 into alinement with the notch 254 and thus permit the withdrawal of the key, and this insures the complete setting to zero of the counter wheels upon this completion of the zero resetting movement of the key. It will be seen that the key pin 255 comes around on the rearward side of the pawl 256 and thus the pivoted plate 251 is positively returned to normal forward position, and furthermore the striking of the pin 255 against this pawl affords a complete stop to the zero resetting movement of the key so as to denote to the operator that the key has been completely turned. The presence of this key stop device mounted on the casing obviates the necessity of having such a stop device mounted on each counter where each counter is separately reset to zero, so that by this means any particular counter may be brought into position to be reset to zero and this one stop device serves for all of the independent counters to arrest the key in each case when the same has been given its proper zero resetting movement. It will be noted that the counter shaft has been given slightly more than a complete rotation but this is compensated for when the arm 233 moves upward as shown in Fig. 2$^a$ when the sliding block 242 moves upward and abuts the disk 224 and returns the same to normal position.

*Transfer devices.*—In connection with the operation of the multiple counters, a novel form of transfer mechanism is provided as shown in Fig. 8. Mounted upon each counter wheel is an ordinary form of tripping disk having a tripping nose 260. This nose 260 is adapted to strike the nose of a tripping pawl 261 which pawl is loosely pivoted at its middle point upon the same transverse shaft 64 upon which the aforesaid arm 63 is mounted which carries the vibrating rod 62 upward and downward as hitherto explained. The rearward end of this tripping pawl or lever 261 has extending laterally from it a projection 262 coöperating with a latching pawl 263 pivoted loosely upon the shaft 264. The forward upper edge of the tripping pawl 261 is arranged to strike a pin 265 projecting laterally from a transfer dog 266 pivoted at its middle point on the side of the registering rack bar 58 for the wheel of next higher order. This transfer dog is normally held in horizontal position as shown in Fig. 8 by a spring 267, the pivotal movement of the dog being controlled by a stop pin 268 projecting from the side of the dog into an enlarged aperture formed in the adjacent rack bar.

Projecting from the arm 63 which as above described is pivoted on the shaft 64 and is utilized for vibrating the cross rod 62, is a cross rod 270 which extends across the upper edges of the rearward ends of all of the aforesaid tripping pawls 261. In the normal position of the parts this cross rod bears against said transfer pawls to hold the forward ends thereof raised and out of the path of the tripping pin 260 of the counter, so that in this normal position of rest the multiple counter reel is free to be rotated whereas of course if the tripping pawls 261 stood normally ready to be engaged by the tripping pins of the counter, the multiple counter reel could not be operated without tripping said tripping pawls and for this reason the tripping pawls are normally held raised above the counter wheels. When however upon the operation of the machine, the aforesaid vibrating rod 62 is carried downward by means of the rocking of the arm 63 for the purpose of carrying the rack bars into mesh with the counter, this upward movement of the rearward end of the arm 63 raises the cross rod 270 from engagement with the rearward ends of the tripping pawls and permits their forward noses to drop into position to be tripped by the tripping pins of the counter, the tripping pawls being spring-pressed to such positions by means of springs 271 suitably seated in the cross bar of the machine. However this movement of the tripping pawls is still further dependent upon the aforesaid latches 263. It will be seen that the rearward edge of each latch 263 is formed with a lower shoulder 272 and an upper shoulder 273, these two shoulders being very near together. In the normal position of the parts, the aforesaid lateral projection 262 of the tripping lever is seated under the lower shoulder 272 of the latch 263 so that the rearward end of the tripping pawl will be held latched down in this position even though the aforesaid cross rod 270 has been raised to permit the rearward end of the pawl to spring upward and carry the forward end downward into engagement with the counter. In order still further to release the tripping pawl, a rocking frame 274 is provided, being pivotally mounted upon the aforesaid shaft 264 upon which the latch pawls 263 are pivoted. Extending upward from this frame is an arm 275 carrying a pin 276 projecting into a cam groove 277 formed in a disk fast upon the lower operating shaft 28, so that upon the operation of the machine this rock frame is rocked downward and upward for the purposes now to be described. Each latch pawl 263 is formed near its pivotal point with a rearwardly projecting shoulder 280 which extends under a portion of the rock frame 274, and springs 281 seated in said rock frame press against another shoulder 282 on the upper end of said latch pawls so as normally to force the lower end of said pawls rearward. Of course the aforesaid rock frame 274 extends across all of the registering rack bars and is formed with suitable slots within which the latch pawls 263 are seated. Although the releasing of the cross rod 270 would still leave the tripping pawl latched under the lower shoulder 272 of the latch pawl 263, yet upon the operation of the machine the rock frame 274 is rocked downward and strikes upon shoulders 280 of the latch pawls and carries their rearward ends forward slightly to permit the tripping pawls to spring upward so that the lateral projections 262 now rest under the upper shoulder 273 of the latch pawls and thus the forward ends of the tripping pawls are in position to be tripped by the counter wheels in the ordinary manner. In the meantime the rock frame has ascended sufficiently to free itself from engagement with the shoulders 280 so that now if upon the forward movement of any registering rack 58 its counter wheel is turned beyond the "9", then its tripping pin 260 will strike the depressed forward end of the tripping pawl 261 and raise the same, thereby depressing the rearward end and whereupon the latch pawl 263 springs rearward to cause the lower shoulder 272 to spring over the later projection 262 and hold the tripping pawl latched in this position. Now upon the forward movement of the rack bar of the next higher order, its pin 265 carried by its transfer dog 266 will strike this raised tripping pawl 261 and ride up upon the same thereby rotating the dog 266 upon its pivotal point and bring the rearward end of said dog into the path of a transfer operating arm 290, which is spring-pressed rearward by means of a spring 291. There are a series of these transfer operating arms 290, one for each rack bar, and they are pivoted on the rod 291ᵃ and carry rearwardly extending arms 292 provided with pins 293 acted upon by cams 294 which are spaced at different intervals around the operating shaft 68 so that the transfer operating arms will be successively operated at each operation of the machine in a well known manner. If any transfer dog 266 has been turned upon its pivot in the manner just described, its rearward end will then be brought into position to be operated by its corresponding transfer operating arm 290 whereupon the corresponding rack bar 58 will be given a positive transfer movement in addition to its normal movement of registration. Near the end of the operation of the machine of course the rack bars 58 are rocked upward again out of mesh with their counter as hitherto described and the cross rod 270 is at the same time carried downward to depress the rearward ends of all of the tripping pawls so that the parts can assume their normal positions as shown in Fig. 8 with the lateral projections 262 resting in under the lower latching shoulders 272 of the latching pawls. Whenever the rack bars are given an additional transferring movement forward, it becomes necessary to restore them backward this unitary distance at the end of the operation of the machine, and this is done by means of projections 295 formed on the rearward side of the latching pawls 263, which projections bear against pins 296 projecting from the side of the corresponding rack bars 58; and the shape of the aforesaid cam groove 277 which rocks the aforesaid rocking frame 274, is such that at the end of the operation of the machine said rock frame is given an upward movement and by bearing against the shoulders 282 of the latch pawls carries the downward portions of said latch pawls rearward a slight extent thereby causing the projections 295 to bear against pins 296 and restore to normal position those rack bars which have been given a unitary transfer movement forward in excess of their normal movement of registration. The rock frame 274 is also provided with a locking extension 297 arranged to engage teeth 298 formed in the registering rack bars to lock said bars in position when the rock frame is moved downward.

*Special counters.*—By referring to Fig. 1 it will be seen that the various counters carried upon the multiple counter reel have eight counter wheels mounted co-axially and the three left-hand counter wheels designated as 300 are intended to be utilized as special counters to have one unit added thereon each time that the corresponding clerk's counter or special transaction counter is operated, the remaining eight wheels being the ordinary main counter wheels of the counter. The method of actuating these special counters is shown in Fig. 10. A special counter operating bar 301 is suitably mounted at its rearward end upon the aforesaid cross shaft 60 upon which the registering bars 58 are mounted, and at its forward end is formed with a slot through which the aforesaid vibrating rod 62 extends so that when said rod is rocked downward to carry the rack bars into mesh with their counter, the operating bar 301 will also be carried downward, and this will carry downward into mesh with the special counter 300 a three-pronged pawl 302 mounted upon the side of the operating bar 301. This three-pronged pawl is of a well known form the different prongs being of different depths to coöperate with notches of different depths of the special counter wheels so as to provide a transfer from one wheel to another in a well known manner. Of course the special counter which this pawl meshes with when the operating bar is thrown downward is the one which is on the same shaft with the counter 150 operated by the rack bars. This operating bar 301 is rocked forward at each operation of the machine so as to cause the pawl 302 to give a unitary movement to the unit wheel of the special counter; by means of an arm 303 pivoted upon the aforesaid shaft 291$^a$ and having a rearwardly extending arm carrying a pin 304 operated upon by a cam groove 305 formed in a disk fast upon the shaft 68 so that near the end of the operation of the machine the arm 303 is thrown forward and acts upon a pin 306 projecting from the bar 301 to force said bar forward to operate the special counter.

While the form of mechanism here shown and described is admirably adapted to fulfil the objects primarily stated, it is to be understood that it is not intended to confine the invention to the one form of embodiment herein disclosed, for it is susceptible of embodiment in various forms all coming within the scope of the claims which follow.

The invention having been described what is claimed as new is as follows:

1. In a cash register, the combination with a primary setting element and means for positioning the same differentially, of means for restoring said primary element to normal position; a secondary setting element; means for positioning said secondary element differentially upon the restoration of said primary element to normal position; accounting devices; means for restoring said secondary element to normal position; and means for actuating said accounting devices by said secondary element upon the restoration of the latter to normal position.

2. In a cash register, the combination with a primary setting element, and a series of keys for positioning the same differentially, of means for restoring said primary setting element to normal position; means for latching said keys in operated position; means for releasing said keys prior to the movement of restoration of the primary setting element; a secondary setting element; means for positioning said secondary setting element upon the restoration of the primary element to normal position; accounting devices; means for restoring said secondary element to normal position; and means for actuating said accounting devices upon the movement of said secondary element to normal position.

3. In a cash register, the combination with a primary setting element and means for positioning the same differentially, of a secondary setting element; normally broken gear connections between said primary element and said secondary element; means for establishing said gear connections; means for restoring said primary element to normal position when said gear connections are established whereby to position said secondary element differentially; accounting devices; means for effecting an engagement between said secondary element and said accounting devices; and means for restoring said secondary element to normal position when such engagement is effected whereby to actuate said accounting devices.

4. In a cash register, the combination with a primary setting element and means for positioning the same differentially; of a secondary setting element; a setting gear for positioning said secondary setting element; means for restoring said primary setting element to normal position; means for connecting said primary setting element with said setting gear when the primary setting element is restored to normal position; and means for connecting said secondary setting element with said setting gear when the setting gear is connected with the primary setting element whereby to position the secondary setting element by the movement of restoration of the primary setting element.

5. In a cash register, the combination with a primary setting element and means for positioning the same differentially, of a secondary setting element; a setting gear for positioning said secondary setting element; means for restoring said primary setting element to normal position; means for connecting said primary setting element with said setting gear when the primary setting element is restored to normal position; means for connecting said secondary setting element with said setting gear when the setting gear is connected with the primary setting element whereby to position the secondary setting element by the movement of restoration of the primary setting element; accounting devices; means for disengaging said secondary setting element from said setting gear and effecting an engagement with said accounting devices; and means for restoring said secondary setting element to normal position when such engagement is effected with the accounting devices whereby to actuate the latter upon such movement of restoration.

6. In a cash register, the combination with a primary setting element and means for positioning the same differentially, of a secondary setting element; a setting gear for positioning said secondary setting element; means for restoring said primary setting element to normal position; means for connecting said primary setting element with said setting gear when the primary setting element is restored to normal position; means for initially restoring said setting gear to normal position prior to the connecting of the same with the primary setting element; and means for connecting said secondary setting element with said setting gear after the setting gear has been initially restored to normal position and while the same is connected with said primary setting element.

7. In a cash register, the combination with a setting element, a series of keys for determining the differential positioning of the same, and a spring for moving said setting element to its differential positions; of a sliding slotted stop plate connected to said setting element and moved thereby to cause the keys to be engaged by the slotted parts of said plate.

8. In a cash register, the combination with a setting element, and a series of keys carrying pins for determining the extent of differential movement of said element, of a spring for moving said element to setting position; and a stop plate formed with differentially inclined recesses coöperating with said key pins to limit the setting movement of said element differentially according to the key depressed.

9. In a cash register, the combination with a setting element, a series of keys for determining the differential positioning of the same, and a spring for moving said element to its differential positions; of a sliding stop plate connected to said setting element and slid thereby past the keys to limit the setting movement of said element, the setting element being positioned to be engaged and adjusted by said keys.

10. In a cash register, the combination with a plurality of independent counters mounted upon a revoluble reel, and means for positioning said reel, of a locking disk carried upon said reel and formed with locking notches; a main operating mechanism; and a pawl operated by said operating mechanism to engage one of said notches and lock said reel when the operating mechanism is actuated.

11. In a cash register, the combination with a plurality of independent counters mounted upon a revoluble reel, and means for positioning said reel, of a differentially movable special setting element; and means for locking said reel upon the initial movement of said differetially movable special element.

12. In a cash register, the combination with a plurality of independent counters mounted upon a revoluble reel, and means for positioning said reel, of a special setting element; a series of special keys for positioning said special element differentially; a notched disk carried by said reel; a locking lever for engaging said disk to lock the reel; and means for operating said locking lever upon the initial movement of said special setting element by any one of said keys.

13. In a cash register, the combination with a plurality of independent counters mounted upon a revoluble reel, means for positioning said reel, a total counter, and means for actuating the latter; of a revoluble total counter controlling disk connected with said reel and formed with a cam groove; and a coupling device having a projection extending into said cam groove whereby when said cam groove is moved to certain positions said coupling device will be operated to prevent the coupling of said total counter to its actuating means.

14. In a cash register, the combination with a differentially adjustable setting element, and a series of special keys corresponding in designations to the different setting positions of said setting element, of a movable detent plate formed with provisions for locking all of said keys from movement except the one corresponding to the adjusted position of said element; means connected with said adjustable element for shifting said detent plate longitudinally to prepare for the unlocking of the proper key; and means for depressing said detent plate transversely when said adjustable element is moved to a certain position whereby to disable the locking effect of said plate and permit the operation of any one of said special keys.

15. In a cash register, the combination with a differentially adjustable setting element, and a series of special keys corresponding in designations to the different setting positions of said adjustable setting element, said keys being formed with locking pins; of a detent plate formed with locking notches to coöperate with said pins; means connected with said adjustable element for shifting said detent plate longitudinally to bring only one of said notches opposite the key pin of the key corresponding to the adjusted position of said element; and means for depressing said plate below the path of travel of said key pins when said lever is moved to a certain one of its adjustable positions whereby any one of said keys may then be depressed.

16. In a cash register, the combination with a differential setting lever, and a series of special keys corresponding in designation to the different setting positions of said lever, said keys being formed with locking pins; of a detent plate formed with notches for coöperating with said pins; a rack and pinion connection between said lever and said detent plate for shifting the latter to bring only one of said notches opposite the key pin of the key corresponding to the adjusted position of said lever, said detent plate being also formed with a cam slot coöperating with a stationary pin to depress the entire plate out of the path of travel of said key pins when the plate is shifted to a certain position by the movement of said lever.

17. In a cash register, the combination with a plurality of independent counters mounted upon a movable carriage, and an inclosing casing formed with an aperture for permitting the resetting to zero of any counter when moved into juxtaposition to said aperture, of a guard for closing said aperture; and means connected with said guard for locking said counter carriage when the aperture is open.

18. In a cash register, the combination with a plurality of independent counters mounted upon a revoluble reel, and an inclosing casing formed with an aperture for permitting access to any counter to restore the same to zero when the counter is brought into alinement with said aperture, of a guard for closing and opening said aperture; and a hook carried by said guard and engaging a projection on said reel to lock the reel when the guard is moved to open the aperture.

19. In a cash register, the combination with a plurality of independent counters mounted upon a movable carriage, and means for positioning said carriage to bring the proper counter into position to be operated, of a zero resetting shaft for each counter; and means common to all of said counters for preventing the rotation of said zero resetting shaft when the counter is in position to be operated.

20. In a cash register, the combination with a plurality of independent counters mounted upon a movable carriage, and means for positioning said carriage to bring the proper counter into position to be operated, of a zero resetting shaft for each counter; and a zero resetting controlling means common to all of said counters for permitting the zero resetting of one of said counters when it is in a certain position and at the same time preventing the resetting of all of the other counters.

21. In a cash register, the combination with a plurality of independent counters mounted upon a movable carriage, and means for positioning said carriage to bring the proper counter into position to be operated, of a zero resetting shaft for each counter; and a zero resetting controlling disk formed with a recess to permit the resetting to zero of one of said counters when the counter is moved to proper position, and at the same time locking all of the turn-to-zero shafts of the other counters from movement.

22. In a cash register, the combination with a plurality of independent counters mounted circumferentially upon a revoluble reel, and means for positioning said reel to bring any desired counter into operative position, of a circular zero resetting controlling disk co-axially mounted with said reel, said disk being formed with a recess for permitting the zero resetting of any counter when brought into alinement with said recess; zero resetting shafts for said counters;

and locking disks carried by said shafts and formed with cut away portions to conform to the periphery of said controlling disk and lock all of said zero resetting shafts from rotation while said locking disks are traveling over said controlling disk until the locking disk is brought into alinement with the aforesaid recess.

23. In a cash register, the combination with a plurality of independent counters mounted upon a movable carriage, and means for positioning said carriage to bring the proper counter into position to be operated, of a zero resetting shaft for each counter; a zero resetting controlling disk formed with a recess to permit the resetting to zero of one of said counters when the counter is moved to proper position, and at the same time locking all of the turn-to-zero shafts of the other counters from movement; a guard for preventing access to the counter which is in position to be reset to zero; and means connected with said guard for closing the recess in said controlling disk to lock the turn-to-zero shaft of the corresponding counter.

24. In a cash register, the combination with a counter provided with a turn-to-zero shaft, of an inclosing casing formed with an aperture to permit access to said shaft, of a guard for closing said aperture, means connected with said guard for locking said turn-to-zero shaft when the guard is positioned to close said aperture.

25. In a cash register, the combination with a plurality of independent counters mounted upon a movable carriage, and means for positioning said carriage, of a turn-to-zero shaft for each counter, an inclosing casing formed with an aperture to permit access to the turn-to-zero shaft of one counter at a time when the counter is brought into juxtaposition with said aperture; a guard for closing and opening said aperture; and means connected with said guard for locking the turn-to-zero shaft of the counter which is positioned for zero resetting, when the guard is in position to close said aperture, and for unlocking said counter shaft when the guard is moved to open the aperture.

26. In a cash register, the combination with a counter including a zero resetting shaft, and an inclosing casing formed with an aperture for permitting the insertion of a zero resetting key to turn said counter to zero, of means mounted on said casing for compelling the key to make more than a full revolution after being attached to the zero resetting shaft; and means connected with the last mentioned means for presenting a full stop to the zero resetting movement of said key.

27. In a cash register, the combination with a counter including a zero resetting shaft, and an inclosing casing formed with an aperture for permitting the insertion of a zero resetting key to turn said counter to zero, of means mounted on said casing for compelling the key to make more than a full revolution after being attached to the zero resetting shaft; and a pawl carried by the last mentioned means for coöperating with the zero resetting key to afford a full stop to the latter on the completion of the zero resetting movement.

28. In a cash register, the combination with a counter including a zero resetting shaft, and an inclosing casing formed with an aperture to permit the insertion of a zero resetting key, of a spring member mounted on the casing and formed with provisions to be engaged by said key to be rotated slightly upon the adjustment of said key for its resetting movement and then to spring back again when the key has begun its zero resetting movement whereby to compel more than the full rotation of said key, the aforesaid provisions also constituting a full stop upon the complete resetting movement of said key.

29. In a cash register, the combination with a plurality of independent counters mounted upon a movable carriage, and means for positioning said carriage, of an inclosing casing formed with an aperture to permit the insertion of a zero resetting key for resetting any counter to zero when the same is brought into juxtaposition with said aperture; and a common stop member mounted upon said casing for affording a complete stop to the resetting key when any one of said counters is reset to zero.

30. In a cash register, the combination with a plurality of independent amount counters mounted upon a movable carriage, actuating racks for operating said counters, and means for positioning said carriage to bring any desired counter into position to be operated by said racks, of a plurality of special counters mounted co-axially with their corresponding amount counters; an actuating device common to said special counters; and means for throwing the actuating racks into engagement with the amount counter and at the same time throwing the actuating means for the special counter into engagement with the corresponding special counter whereby to add one unit on the special counter in conjunction with the operation of the corresponding amount counter.

31. In a cash register, the combination with a counter, including transfer controlling elements, actuating racks for said counter, and means for giving said racks their differential movement; of separate devices for giving said racks an extra movement to add the transfers, and elements mounted on said racks, constructed to be positively moved by the counter into positions to connect said separate devices and racks.

32. In a cash register, the combination with a counter including transfer controlling elements, actuating racks for said counter, and an operating mechanism for said racks; of separate actuating devices connected to said operating mechanism for adding the transfer, and arms mounted on said racks constructed to be positively moved by the counter into the path of said separate actuating devices.

33. In a cash register, the combination with a counter including transfer controlling elements, actuating racks for said counter, and a main operating mechanism for moving said racks; of a separate actuating means connected to said operating mechanism, elements mounted on said racks constructed to be positively moved by said counter into the path of said actuating means, and means for giving said racks a retrograde motion to normal position after the separate actuating means has operated them.

34. In a cash register, the combination with a counter including transfer elements, actuating racks for operating said counter, and means for moving said racks to actuate the counter differentially; of transfer controlling elements carried upon said racks and adjusted for a transfer by the complete rotation of the counter wheel of lower order; and a separate actuating means for engaging said transfer controlling elements to give said racks a positive transfer movement.

35. In a cash register, the combination with a setting element, and a series of keys for determining the differential positioning of same; of a spring for moving said element, a stop plate connected with said element and coöperating with the keys to limit the movement of said element, a counter and operating devices therefor, and means for engaging said setting element and said operating devices after said element has been set.

36. In a cash register, the combination with a plurality of counters, of a rotatable carrier supporting same, an indicating mechanism, a disk moved with said carrier and having a cam groove therein, and means controlled by said groove for determining the differential positioning of the indicating mechanism.

37. In a cash register, the combination with a plurality of accounting devices, of a rotatable carriage in which said counters are mounted, a differentially adjustable indicating mechanism, a cam moved with said carriage, and connections whereby said cam controls the differential positioning of said indicating mechanism.

38. In a cash register, the combination of a rotatable support, and a plurality of counters carried thereby, of keys for indicating characteristics of transactions, and means controlled by said keys when depressed for locking said support.

39. In a cash register, the combination with counters and a rotatable reel carrying said counters, an operating mechanism, a special key and two locks for said reel, one operated by said mechanism and the other by said key.

40. In a cash register, the combination with a rotatable carrier, and a series of accounting devices mounted thereon, of a series of special counters, one for each accounting device also mounted on said carrier, means for actuating any accounting device when the same has been adjusted, and means common to all said special counters for actuating the counter corresponding to the operated accounting device.

41. In a cash register, the combination with a rotatable reel and a plurality of accounting devices mounted thereon, of a special counter for each accounting device, also mounted on said reel, and an operating device for operating the special counter corresponding to a selected accounting device.

42. In a cash register, the combination with a rotatable reel and a plurality of registers thereon, of a special counter for each register mounted co-axially therewith, and an operating device common to said special counters and serving to operate any of the same.

43. In a cash register, the combination with a main operating mechanism, a rotatable carrier, counters mounted on said carrier, a special key, and a single locking element normally locking said operating mechanism with connections whereby the depression of said special key moves said locking element to a position releasing said main operating mechanism and locking said rotatable carrier.

44. In a cash register, the combination with a main operating mechanism, of a plurality of counters actuated thereby, and a movable support common to said counters, of means for locking said operating mechanism and said support, and a special key, with connections whereby actuation of said key operates said locking means to a position such that the operating mechanism is released and the movable support is locked.

45. In a cash register, the combination with an operating mechanism, of a plurality of counters, and a common rotatable frame supporting said counters, of a rigid element common to both said frame and said operating mechanism and normally positioned to lock said operating mechanism, a special key and means controlled thereby for moving said locking element to a position permitting movement of said operating mechanism but preventing movement of said rotatable frame, 46. In a cash register, the combination with a plurality of counters, and a rotatable support for same, of a bank of special keys, and a locking device for said support with connections actuated by a special key when depressed for moving said locking device to locking position.

47. In a cash register, the combination with a plurality of counters and a movable support for all said counters, of a locking device for said support comprising a pivoted arm having a cam slot and normally in releasing position, a special key, and a device actuated thereby and having a portion projecting in said cam slot for moving said locking device to locking position as said key is actuated.

48. In an accounting machine, the combination with a registering mechanism comprising a plurality of movable elements, of actuating devices for said elements, and means for positively moving said devices an additional step to effect transfers between said elements and then positively restoring said devices to normal position during a single operation of the machine.

49. In an accounting machine, the combination with a registering mechanism comprising a plurality of movable elements, of actuating devices for said movable elements, means for positively moving said devices an additional step to effect transfers between said elements, and a second means for positively restoring said elements to normal position.

50. In an accounting machine, the combination with a registering mechanism comprising a plurality of movable elements, of actuating devices for said elements, levers carried by the actuating devices, means contacting with said levers when transfers are to be effected and thereby moving said actuating devices an additional step, and pawls for positively restoring said actuating devices to normal position.

51. In an accounting machine, the combination with a registering mechanism comprising a plurality of movable elements, of actuating devices therefor, mechanism for effecting transfers between said elements, a series of trip pawls actuated by the registering elements and controlling the transfer mechanism, latching pawls normally holding the trip pawls in inoperative positions, means for actuating the latching pawls upon each operation of the machine, and springs for throwing the trip pawls in operative positions when the latching pawls are actuated.

52. In an accounting machine, the combination with a registering mechanism comprising a plurality of movable elements, of actuating devices for said elements, means for differentially adjusting the actuating devices, the said actuating devices being normally disconnected from the adjusting means and the movable elements of the registering mechanism, an operating mechanism, and means actuated thereby for first connecting the actuating devices to the adjusting means to be adjusted thereby, then connecting the said devices to the movable elements of the registering mechanism and finally restoring the actuating devices to normal position thus actuating the registering elements.

In testimony whereof I affix my signature in the presence of two witnesses.

THOMAS CARROLL.

Witnesses:
 Wm. O. Henderson,
 Carl W. Beust.